A. SHUMAN.
SKYLIGHT.
APPLICATION FILED JAN. 24, 1914.

1,156,251. Patented Oct. 12, 1915.

WITNESSES:

INVENTOR
Arno Shuman
BY
Augustus B. Stoughton.
ATTORNEY.

UNITED STATES PATENT OFFICE.

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

SKYLIGHT.

1,156,251.      Specification of Letters Patent.      Patented Oct. 12, 1915.

Application filed January 24, 1914. Serial No. 814,020.

*To all whom it may concern:*

Be it known that I, ARNO SHUMAN, a citizen of the United States, and a resident of Philadelphia, in the county of Philadelphia and State of Pennsylvania, have invented certain new and useful Improvements in Skylights, of which the following is a specification.

Heretofore glass has been provided with ribs for the purpose of diffusing light; and it has been suggested that skylight glass be provided with ribs extending transversely or crosswise of the sheet with a view to preventing the water of condensation from dropping by shortening the distance that the water of condensation has to travel in order to reach the longer edges of the sheets of glass. Contrasted with this, my invention is not concerned with the diffusion of light, nor with shortening the path traveled by moisture of condensation in its passage from skylight glass. On the contrary the object of my invention is to provide a sheet of skylight glass adapted to conduct or lead away moisture throughout its entire length, even when the sheet is at a comparatively slight inclination and so prevent moisture from dropping.

The invention, broadly stated, consists in a sheet of skylight glass having upon its surface longitudinal channels not exceeding one-eighth of an inch in width at the pitch line and constituting segments of capillary tubes, and the invention further comprises the improvements to be presently described and finally claimed.

Figure 1:
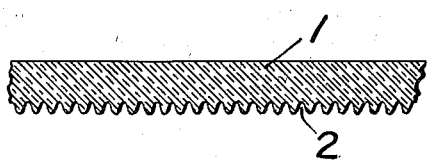
Figure 2:
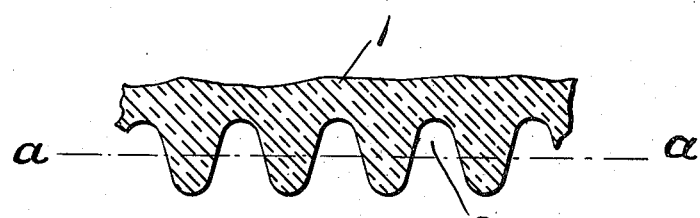

Referring to the drawings, Figure 1 is a transverse sectional view of a sheet of glass embodying features of my invention. Fig. 2 is a similar view drawn to a greatly exaggerated scale, and Fig. 3, is a diagrammatic view illustrating features of the invention.

In the drawings 1 is a sheet of skylight glass having in one face thereof parallel open channels 2 ranging in the direction of the length of the sheet and constituting segments of capillary tubes. The cross-sectional shape and size of the open channels 2 must be such as will constitute them segments of capillary tubes, or such as will exert the necessary capillary action for conducting moisture throughout the entire length of the sheet, even if the latter be of considerable length and at a comparatively slight inclination. As shown in the drawings the depth of the channels is greater than their width. As shown, the channels are nearly twice as deep as they are wide at the pitch line or mean line of depth $a-a$. Furthermore as shown the channels are without angles or in other words have a rounded contour.

The described form of channel is, I believe, the best for accomplishing the objects of the invention, but I do not desire to limit the invention to that exact form and size and in this connection I may say that if the channels are too wide and large they would not be segments of a capillary tube, nor would they have the capillary action nor would they perform the results attained by my invention. I mention as an example of the limit of width, one-eighth ($\frac{1}{8}''$) of an inch, at the pitch line $a-a$, but I do not mean to confine my invention to that exact dimension and I may further say that the intention of this description is to define the best cross sectional shape known to me at this time for the channels, so that they may constitute segments of capillary tubes, but of course without excluding other and equivalent cross-sectional shapes and sizes. The well known laws applicable to capillary action in tubes of round or other bore are applicable to the capillary channels which, as has been said, are segments of such tubes and from this, those skilled in the art will understand that there is considerable latitude in the design of the cross-section as well as in the size of the channels.

Figure 3:
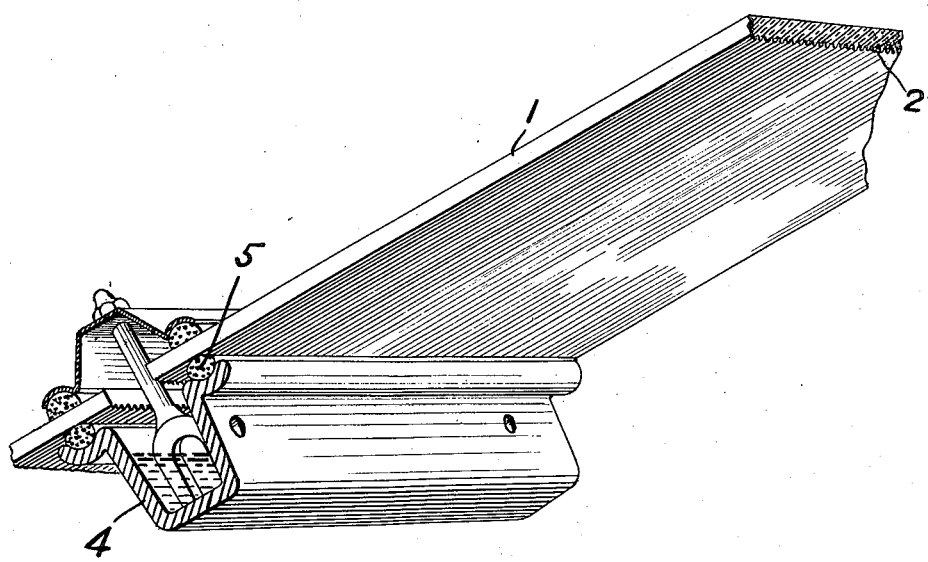

In Fig. 3, the sheet of skylight glass is shown as inclined with the open segments of capillary tubes ranging up and down, that is, in the direction of the length of the sheet and of the pitch of the roof.

4, is a portion of the skylight frame and 5 is a wick or drainage means, which may be provided at the bottom or lowest edge of the sheet 1.

In use the segments of capillary channels by capillary action retain moisture which condenses on the sheet and conduct the liquid of condensation along the entire length of the sheet to the lower edge thereof, so that no moisture drops from the skylight.

Skylights can be made from the described sheets of glass of comparatively great length and little pitch or elevation, so that a material saving is effected not only in the amount of glass required, but also in the general roof construction.

A segment of a capillary tube means such a groove or channel as will retain water of condensation so that it travels in the groove itself, as distinguished from the edges of the rib, even though the sheet be only at a slight inclination to the horizontal. Such a groove has been herein defined and it was stated that one-eighth of an inch at the pitch line is an example of the extreme width. By a slight angle to the horizontal it may be said that an angle under twenty degrees is referred to.

What I claim is:

1. A skylight at an angle less than twenty degrees to the horizontal having grooves running in the direction of its length and of such width and depth that water of condensation travels in the grooves as distinguished from the edges of the ribs or projections.

2. A sheet of glass having in the face thereof parallel open channels not exceeding one eighth of an inch in width at the pitch line and of which the depth exceeds the width at the pitch line and which constitute segments of capillary tubes adapted to hold water within them.

3. A sheet of skylight glass having in the face thereof parallel open channels of rounded cross-section not exceeding one eighth of an inch in width at the pitch line and of which the depth exceeds the width at the pitch line and which constitute segments of capillary tubes.

In testimony whereof I have hereunto signed my name.

ARNO SHUMAN.

Witnesses:
CLIFFORD K. CASSEL,
K. M. GILLIGAN.